(12) United States Patent
Mildh

(10) Patent No.: US 8,738,003 B2
(45) Date of Patent: May 27, 2014

(54) METHOD AND ARRANGEMENT FOR MANAGING USER EQUIPMENT ACCESS IN A WIRELESS COMMUNICATION SYSTEM

(75) Inventor: Gunnar Mildh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 233 days.

(21) Appl. No.: 13/265,957

(22) PCT Filed: May 29, 2009

(86) PCT No.: PCT/SE2009/050621
§ 371 (c)(1),
(2), (4) Date: Oct. 24, 2011

(87) PCT Pub. No.: WO2010/138037
PCT Pub. Date: Dec. 2, 2010

(65) Prior Publication Data
US 2012/0044907 A1    Feb. 23, 2012

(51) Int. Cl.
*H04W 36/00* (2009.01)
(52) U.S. Cl.
CPC ...................... *H04W 36/00* (2013.01)
USPC ........................................................ 455/439
(58) Field of Classification Search
USPC ......... 370/229, 230, 232, 235, 236, 310, 328, 370/329, 331, 412, 415, 429, 443, 444; 455/403, 422.1, 432.1, 436, 437, 438, 455/439, 442, 443, 450, 451, 452.1
See application file for complete search history.

(56) References Cited

U.S. PATENT DOCUMENTS

| 5,301,356 | A  | * | 4/1994 | Bodin et al. ................. 455/436 |
| 6,052,598 | A  | * | 4/2000 | Rudrapatna et al. ....... 455/456.1 |
| 2004/0102194 | A1 | * | 5/2004 | Naghian et al. ............... 455/436 |
| 2005/0181782 | A1 | * | 8/2005 | Hollis et al. .................. 455/424 |
| 2010/0332610 | A1 | * | 12/2010 | Cherian et al. ................ 709/207 |

FOREIGN PATENT DOCUMENTS

WO      WO 0130107 A2 *  4/2001

OTHER PUBLICATIONS

International Search Report, PCT Application No. PCT/SE2009/050621, Jun. 10, 2010.
Written Opinion of the International Searching Authority, PCT Application No. PCT/SE2009/050621, Jun. 10, 2010.
International Preliminary Report on Patentability, PCT Application No. PCT/SE2009/050621, Sep. 30, 2011.

(Continued)

*Primary Examiner* — Edan Orgad
*Assistant Examiner* — Curtis A Alia
(74) *Attorney, Agent, or Firm* — Myers Bigel Sibley & Sajovec, P.A.

(57) ABSTRACT

Methods and arrangements in a node in a wireless communication system for managing user equipment access to the target node. The wireless communication system comprises the target node, a source node, a core network node and a user equipment. The user equipment is configured for wireless communication over a bearer with the source node and for performing a handover from the source node to the target node. The method comprises receiving a bearer request associated with the user equipment, obtaining a time information parameter associated with the queuing time of the bearer request in at least the source node, checking if communication resources are available for establishing a bearer with the user equipment. If communication resources are not available, the bearer request is placed in a priority queue, based on the received time information parameter.

22 Claims, 8 Drawing Sheets

(56) References Cited

OTHER PUBLICATIONS

Huang, "Performance Analysis for UMTS Networks With Queued Radio Access Bearers", *IEEE Transactions on Vehicular Technology*, vol. 51, No. 6, Nov. 2002, pp. 1330-1337.

3GPP, "Universal Mobile Telecommunications System (UMTS); UTRAN Iu Interface: General Aspects and Principles (3GPP TS 25.410 version 3.8.0 Release 1999); ETSI TS 125 410", ETSI Standsrds, LIS, Sophia Antipolis Cedex, France, vol. 3-R3, No. V3.8.0, Sep. 1, 2002, 26 pp.

$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), 3GPP Standard, 3GPP TS 23.401, V8.5.0, Mar. 2009, 223 pages.

$3^{rd}$ Generation Partnership Project; Technical Specification Group Radio Access Network; UTRAN Iu interface Radio Access Network Application Part (RANAP) signalling (Release 8), 3GPP Standard, 3GPP TS 25.413, V8.2.1, Mar. 2009, 394 pages.

$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP Standard, 3GPP TS 36.300, V8.8.0, Mar. 2009, 157 pages.

$3^{rd}$ Generation Partnership Project; Technical Specification Group Radio Access Network; Evolved Universal Terrestrial Radio Access Network (E-UTRAN); S1 Application Protocol (S1AP) (Release 8), 3GPP Standard, 3GPP TS 36.413, V8.5.1, Mar. 2009, 215 pages.

\* cited by examiner

METHOD AND ARRANGEMENT FOR MANAGING USER EQUIPMENT ACCESS IN A WIRELESS COMMUNICATION SYSTEM

CROSS REFERENCE TO RELATED APPLICATION

This application is a 35 U.S.C. §371 national stage application of PCT International Application No. PCT/SE2009/050621, filed on 29 May 2009, the disclosure and content of which is incorporated by reference herein in its entirety. The above-referenced PCT International Application was published in the English language as International Publication No. WO 2010/138037 A1 on 2 Dec. 2010.

TECHNICAL FIELD

The present invention relates to a method and an arrangement in a target node and a method and an arrangement in a node. More particularly, the present invention relates to a mechanism for managing user equipment access to the target node when performing a handover of a user equipment in a wireless communication system.

BACKGROUND

The success of commercial cellular networks based on GSM/WCDMA/CDMA radio access technologies etc. has lead to an increasing interest to also offer priority services or public safety services such as e.g. fire department, police networks, over these networks and in such way complement or replace existing dedicated public safety networks and technologies such as TErrestrial Trunked RAdio (TETRA), by European Telecommunications Standards Institute (ETSI), or other professional mobile radio systems. Given also the introduction of new cellular radio access technologies such as Long Term Evolution (LTE) and the evolution of existing cellular networks towards offering mobile broadband services it is also of interest to extent the scope of priority services to not include only voice services but also to include Internet Protocol (IP) and multimedia based services such as e.g. Video calls, Push to talk, Voice over IP.

The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture.

Specific requirements on 3GPP access are specified, which need to be fulfilled to support multimedia priority services. These requirements are inline with requirements in other standardization bodies or governmental agencies such as Government Emergency Telecommunications Service (GETS). GETS is a White House-directed emergency phone service provided by a division of the Department of Homeland Security. GETS uses enhancements based on existing commercial technology.

Multimedia priority services put requirements on the networks to support multiple priority levels and to ensure that priority users are prioritized when it comes to access to radio resource over other non-priority users e.g. commercial users. Furthermore, it is required that the network support queuing at congestion in scenarios where pre-emption of lower priority users resources are not possible or allowed for commercial or regulatory purposes.

In order to support fair and strict priority queuing at radio resource congestion in the 3GPP networks it is required that the priority queuing mechanism is implemented close to the radio network where the radio resource congestion occurs. Queuing at application level will make it difficult to guarantee fairness between different users since the application server will not be aware of the congestions on the radio cell level.

Basic support for queuing for setup of Radio Access Bearers (RAB) in the Radio Network Controller (RNC) in Universal Mobile Telecommunications System (UMTS) Terrestrial Radio Access Network (UTRAN)/Wideband Code Division Multiple Access (WCDMA) is standardized. The purpose of this functionality in UTRAN is to allow the RNC to queue bearer requests for one user. The standardized functionality does not support fair priority queuing between different users and the queuing also is not maintained when an inter-RNC handover is performed since in this scenario all pending RAB request will need to be aborted.

For Circuit Switched (CS) services in GSM and UTRAN there is also support for queuing in the scope of enhanced Multi-Level Precedence and Pre-emption service (eMLPP). Also in this case will the queuing not support inter-Base station or inter-RNC handovers (HO).

Not maintaining queuing status at inter-BSC and inter-RNC handovers may be acceptable in existing GSM/UTRAN networks since the BSCs and RNCs cover a large area and inter-BSC/RNC handovers are rare. There is however a recent trend in cellular networks to use a more flat RAN architecture where there are no central coordinating node which owns the cell level resources. Instead the cell level resources are owned by the base station. LTE (E-UTRAN) radio access network is an example of a radio network using a flat architecture where the base station node (eNodeB or eNB) only serves a few cells. LTE is sometimes also referred to as Evolved UMTS Terrestrial Radio Access Network (E-UTRAN). Flat architectures are also possible for UTRAN and WiMAX networks. No queuing mechanism has been defined in LTE (E-UTRAN).

Current queuing mechanism as for instance defined in 3GPP does not support the case when the node performing the admission control, i.e. the cell resource owner, and maintaining the queuing is changed e.g. an inter-RNC handover. There is therefore a risk that the user session in such a queue would either be blocked or will loose its position in the queue. Since these types of handovers will be very frequent in LTE and other networks using a flat RAN architecture it will be difficult with the existing solutions to maintain a fair and strict priority queue in case of radio network congestion affecting multiple cells.

Currently it is specified that any pending bearer requests will be ignored or dropped for users experiencing inter-eNodeB handover. In this case it is required that the queued bearer request is re-requested from the MME in the new eNodeB however in this case the queuing time in the source eNodeB will not be known in the target eNodeB so the target eNodeB has no choice but to put the new request at the end of its queue (assuming the target cell is also congested). If the user then moves on to a new or old eNodeB before the pending bearer is setup the same process will be repeated again meaning that in theory the bearer request will be queued for a significantly longer time compared to if the user was stationary. This leads to unfairness between different users and will introduce some unpredictability in the queuing process which might mean that the queuing solution do not fulfill the requirements.

SUMMARY

It is an object of the present invention to provide an improved performance in a wireless communication system.

The object is achieved by a method in a target node in a wireless communication system. The method aims at managing user equipment access to the target node. The wireless communication system comprises the target node, a source node, a core network node and a user equipment. The user equipment is configured for wireless communication over a bearer with the source node and for performing a handover from the source node to the target node. The method comprises receiving a bearer request associated with the user equipment. The method also comprises obtaining a time information parameter associated with the queuing time of the bearer request in at least the source node. Further, the method comprises checking if communication resources are available for establishing a bearer with the user equipment. In further addition, the method comprises placing the bearer request in a priority queue, based on the received time information parameter, if communication resources are not available.

The object is also achieved by an arrangement in a in a target node in a wireless communication system. The arrangement is configured for managing user equipment access to the target node. The wireless communication system comprises the target node, a source node, a core network node and a user equipment. The user equipment is configured for wireless communication over a bearer with the source node and for performing a handover from the source node to the target node.

The arrangement comprises a receiving unit. The receiving unit is adapted to receive a bearer request associated with the user equipment. Further, the arrangement comprises an obtaining unit. The obtaining unit is adapted to obtain a time information parameter associated with the queuing time of the bearer request in at least the source node. Further yet, the arrangement in addition comprises a checking unit. The checking unit is adapted to check if communication resources are available for establishing a bearer with the user equipment. Also, in addition, the arrangement further comprises a queue placing unit. The queue placing unit is adapted to place the bearer request in a priority queue, based on the received time information parameter.

The object is also achieved by a method in a node in a wireless communication system. The method aims at managing user equipment access to a target node. The wireless communication system comprises a core network node, the target node, a source node, and a user equipment. The user equipment is configured for wireless communication over a bearer with the source node and for performing a handover from the source node to the target node. The method comprises establishing a time information parameter associated with the queuing time of a bearer request of the user equipment in at least the source node. Also, the method further comprises sending the bearer request to the target node.

The object is also achieved by an arrangement in a node in a wireless communication system. The arrangement is configured for managing user equipment access to a target node. The wireless communication system comprises a core network node, the target node, a source node, and a user equipment. The user equipment is configured for wireless communication over a bearer with the source node and for performing a handover from the source node to the target node. The arrangement comprises an establishing unit. The establishing unit is adapted to establish a time information parameter associated with the queuing time of a bearer request of the user equipment, in at least the source node. Also, the arrangement comprises a sender. The sender is adapted to send the bearer request comprising the time information to the target node.

The present methods and arrangements provides a mechanism which would allow fair priority queuing also for users experiencing inter-eNB handovers. This is achieved by introducing a time stamping mechanism which can be used to let session belonging to mobile users that have queued in one eNodeB/cell to get appropriate priority when entering a new eNodeB/cell which is also experiencing congestion. The solution also makes it possible for users to return to their old position in the queue if they would return to the same eNodeB as they have queued in before. Thereby the overall system performance in the wireless communication system is improved.

An advantage of the solution is that it makes it possible to support fair and strict priority queuing also during mobility, where the node responsible for admission control and queuing is changed.

BRIEF DESCRIPTION OF THE DRAWINGS

The present invention will now be described more in detail in relation to the enclosed drawings, in which.

DETAILED DESCRIPTION

The invention is defined as a method and an arrangement in a target node and a method and an arrangement in a node, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method and arrangement in a base band unit to any of the particular forms disclosed, but on the contrary, the present methods and arrangements are to cover all modifications, equivalents, and alternatives falling within the scope of the invention as defined by the claims.

Still other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1:
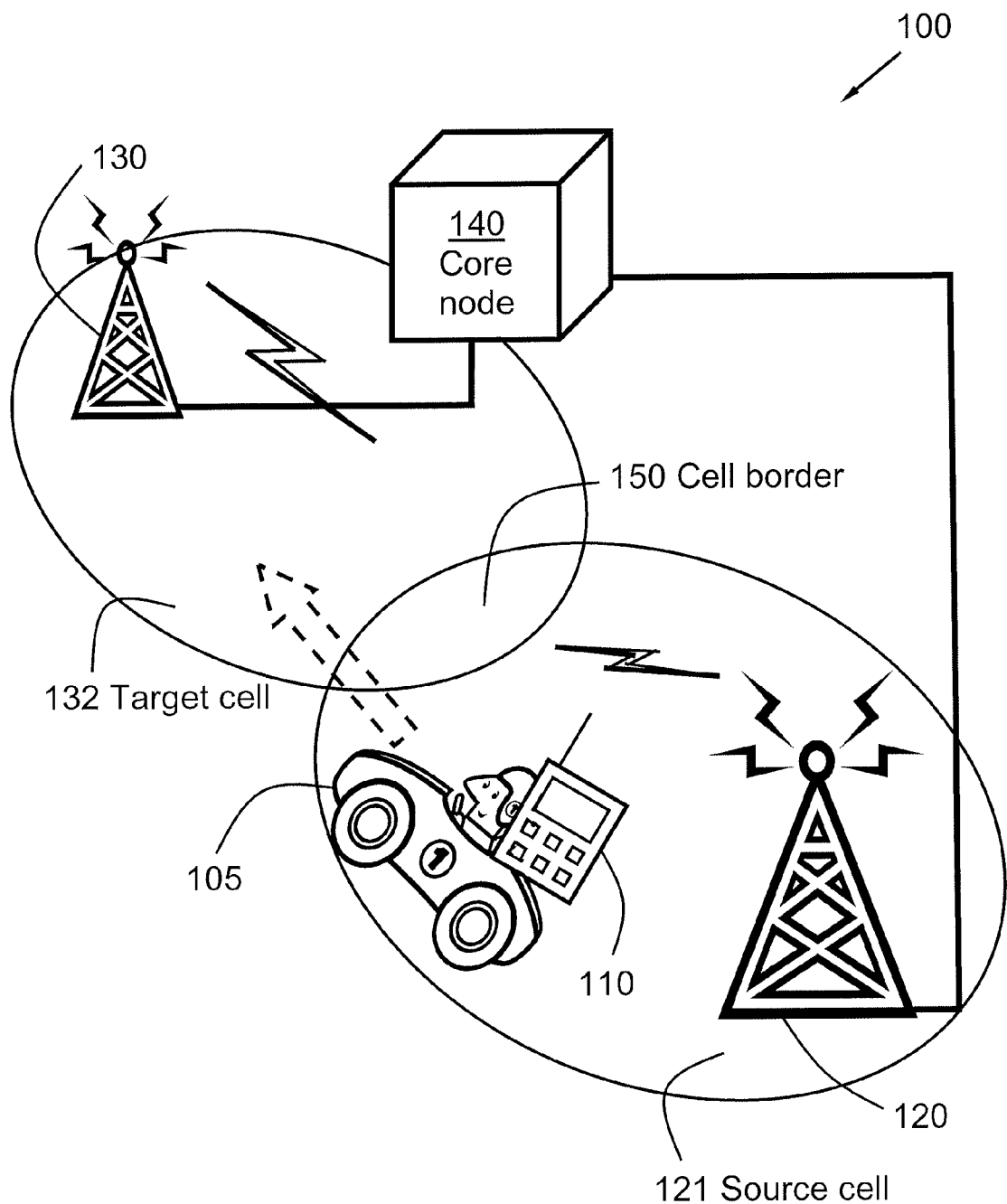
FIG. 1 is a schematic block diagram illustrating a wireless communication system according to an embodiment of the present solution.

FIG. 1 is a schematic illustration over a wireless communication system 100 and a user equipment 110 comprised within the wireless communication system 100. A user situated in a vehicle 105 is managing a user equipment 110, within the wireless communication system 100. Further, the wireless communication system 100 may comprise a source node 120, or source base station, in a source cell 121 and a target node 130, or target base station, in a target cell 132. The source cell 121 and the target cell 132 are separated by a cell border 150.

Although two base stations 120, 130 are shown in FIG. 1, it is to be understood that another configuration of base station transceivers may be connected through, for example, a mobile switching centre and other network nodes, to define the wireless communication system 100. Further, the base stations 120, 130 may be referred to as e.g. an evolved Node B (eNode B), a Node B, an access point, a Remote Radio Unit (RRU) and/or a base transceiver station, Access Point Base Station, base station router, etc depending e.g. of the radio access technology and terminology used.

In some embodiments, the user equipment 110 may be represented by a wireless communication terminal, a mobile cellular telephone, a Personal Communications Systems terminal, a Personal Digital Assistant (PDA), a laptop, a computer or any other kind of device configured to manage radio resources.

The user equipment 110 is adapted to communicate with the base stations 120, 130 over a bearer. The bearer may in this context be seen as a resource for transmitting any user data such as e.g. a bearer channel for carrying user data to/from the user equipment 110.

The wireless communication system 100 may be based on a technology such as e.g. LTE just to mention a none limiting example. However, the wireless communication system 100 may be based on technologies such as e.g. Global System for Mobile Telecommunications (GSM), Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) etc, just to mention some none limiting examples.

Further, as used herein, the wireless communication system 100 may relate to various radio access technologies in the traditional sense, a wireless local area network (LAN) or a wireless personal area network without departing from the teachings of the present invention. These networks may comprise, for example, radio access technologies, such as Enhanced Data rates for GSM Evolution (EDGE), General Packet Radio Service (GPRS), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication technology.

It is to be noted however, that the invention is not in any way limited to be performed exclusively in a wireless communication system 100, but may be performed in a wireless communication system 100 wherein some nodes are wirelessly connected and some nodes have a wired connection.

The wireless communication system 100 further comprises a core network node 140. The core network node 140 may be represented by e.g. a MME, according to some embodiments. The core network node 140 is situated in one place and may provide services to several nodes 120, 130. The nodes 120, 130 may be placed several kilometres away from each other and the core network node 140.

The user equipment 110 may communicate with other wireless communication devices, or network nodes not shown in FIG. 1, via any, some or all of the source node 120 or the target node 130 comprised within the wireless communication system 100.

FIG. 1 further illustrates the user equipment 110 as it moves from the source node 120 towards the target node 130. Somewhere in the proximity of the cell border 150 in FIG. 1, the target node 130 becomes the best node. At that point in time, it may be decided to initiate a handover from the source node 120 to the target node 130.

However, in the illustrated example, the bearer request of the user equipment 110 is placed in a queue at the source node 120 due to traffic congestion at the source node 120. Also the target node 130 is congested in the illustrated example. When the handover is to be performed, the bearer request of the user equipment 110 is placed in a queue in the target node 130, in a place corresponding to the already passed waiting time and/or priority level as will be explained in the following illustrated examples.

The handover may be performed due to several reasons. One is that the radio link quality is better on one radio link than another radio link. However, a handover may also be made e.g. in order to balance the load between the source nodes 120 and the target node 130, according to some embodiments. Thus a handover to a target cell 130 may be performed in order to avoid traffic congestion in the source node 120, according to some embodiments.

Figure 2:
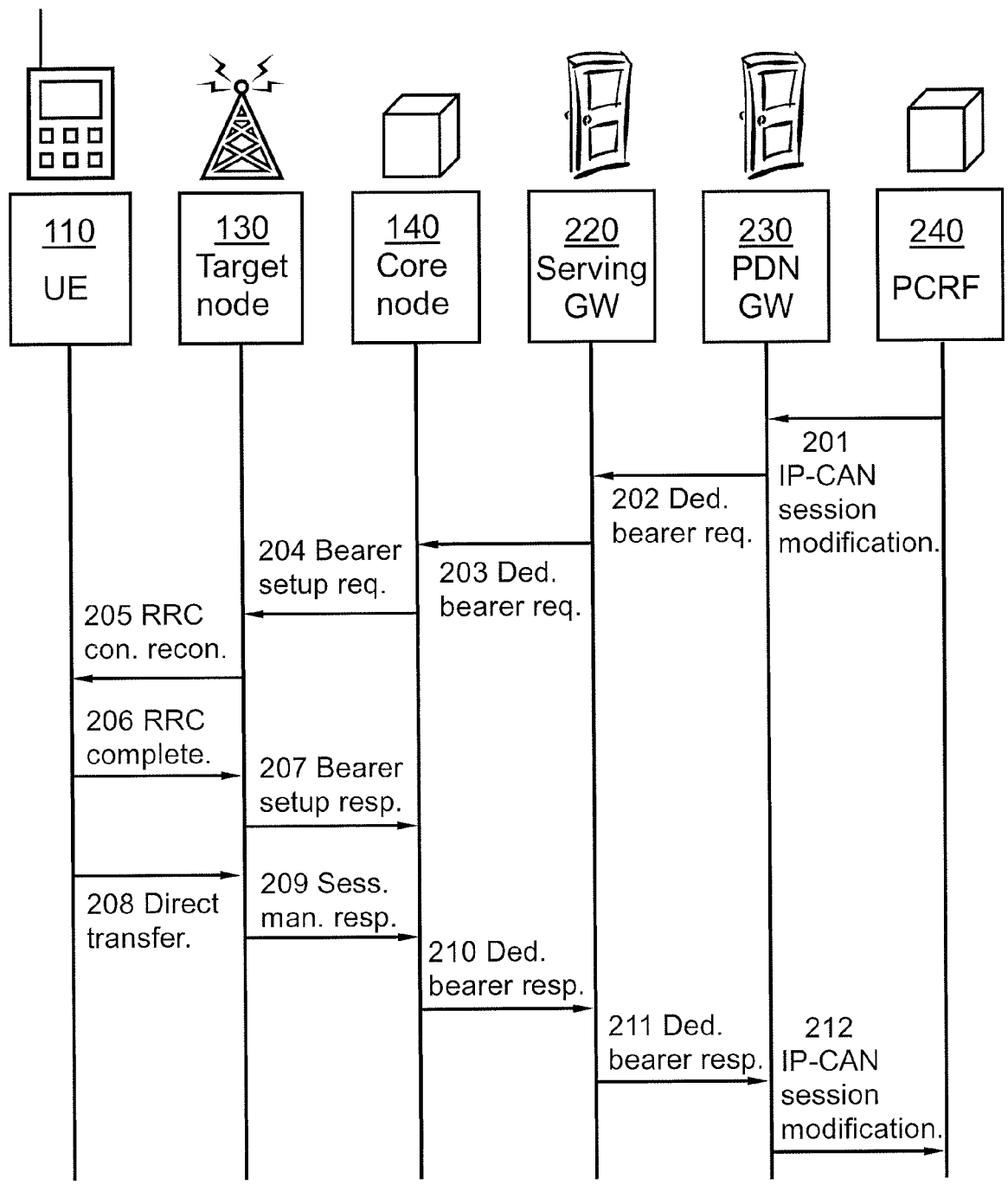
FIG. 2 is a combined signaling and flowchart illustrating an embodiment of the present method according to some embodiments.

FIG. 2 illustrates an embodiment of the present method comprising a dedicated bearer setup procedure in 3GPP LTE, and the environment wherein the present method may operate. Queuing for priority services may be introduced in this procedure by the target node 130, holding step 205 and onwards until the radio resources are available to serve the requested bearer. This is possible since the target node 130 has complete knowledge of the radio resource situation in the cell 131 and may also queue requests associated with other users in the same way thus it is possible to provide fair priority queuing between different users in the same target node 130.

The dedicated bearer setup procedure for the user equipment 110 may be divided into a number of steps 201-212.

Step 201
An IP CAN session modification message is sent from a PCRF 240 to the PDN gateway 230.

Step 202
A dedicated bearer request is created at the PDN gateway 230 and sent to the serving gateway 220.

Step 203
The dedicated bearer request is forwarded from the serving gateway 220 to the core network node 140.

Step 204
A bearer setup request and/or session management request is sent from the core network node 140 to the target node 130. The bearer setup request comprising time information and/or a priority level value associated with the user equipment 110.

The time information parameter may be either an absolute time on when the bearer was first requested at the source node 120 or a relative time on how long the bearer request has been queued in other nodes.

Figure 4:
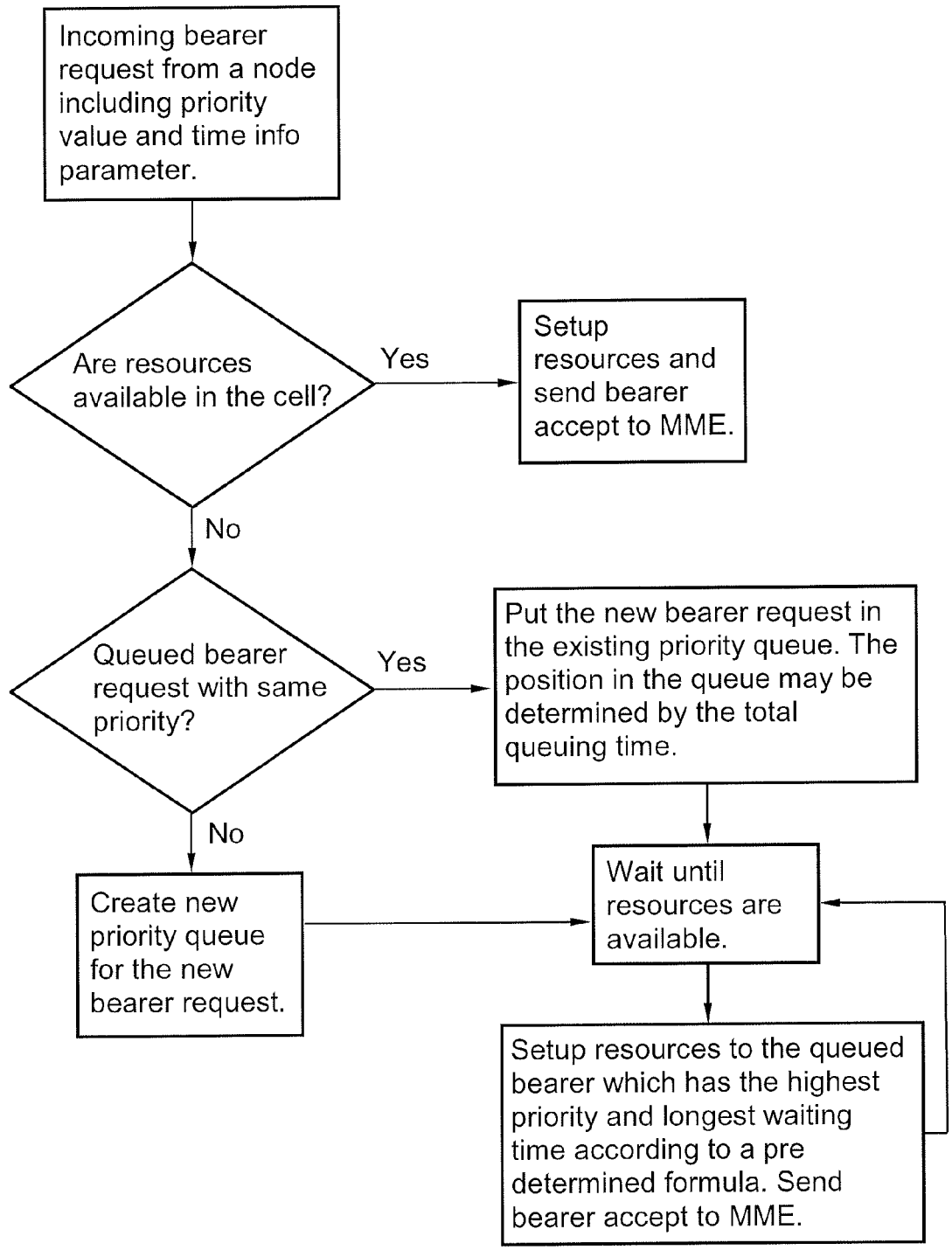
FIG. 4 is a flow chart depicting the present method according to some embodiments.

The target node 130 may use this time information to determine which place the bearer request would have in the priority queue in case of congestion, as further explained in association with FIG. 4.

Step 205

A RRC connection reconfiguration is sent in a message from the target node 130 to the user equipment 110.

Step 206

A message confirming the RRC connection reconfiguration complete is sent in a message from the user equipment 110 to the target node 130.

Step 207

A bearer setup response is sent from the target node 130 to the core network node 140.

Step 208

A direct transfer is made from the user equipment 110 to the target node 130.

Step 209

A session management response message is sent from the target node 130 to core network node 140.

Step 210

The core network node 140 creates a dedicated bearer response to the serving gateway 220.

Step 211

The serving gateway 220 forwards the dedicated bearer response to the PDN gateway 230.

Step 212

The PDN gateway 230 send a IP CAN session modification message to the PCRF.

In case a handover between the source node 120 and the target node 130 occurs, the core network node 140 re-requests the queued bearer request in the target node 130 and includes similar time information making it possible for the queued bearer request to get priority over bearer requests with shorter queuing time. In case relative time information is used the queuing time may be updated in the core network node 140 or alternatively reported from the source node 120 to the target node 130. In case the time information is absolute it does not need to be updated but instead it may require that the clocks in the different nodes 120, 130, 140 are reasonable synchronized.

Figure 3:
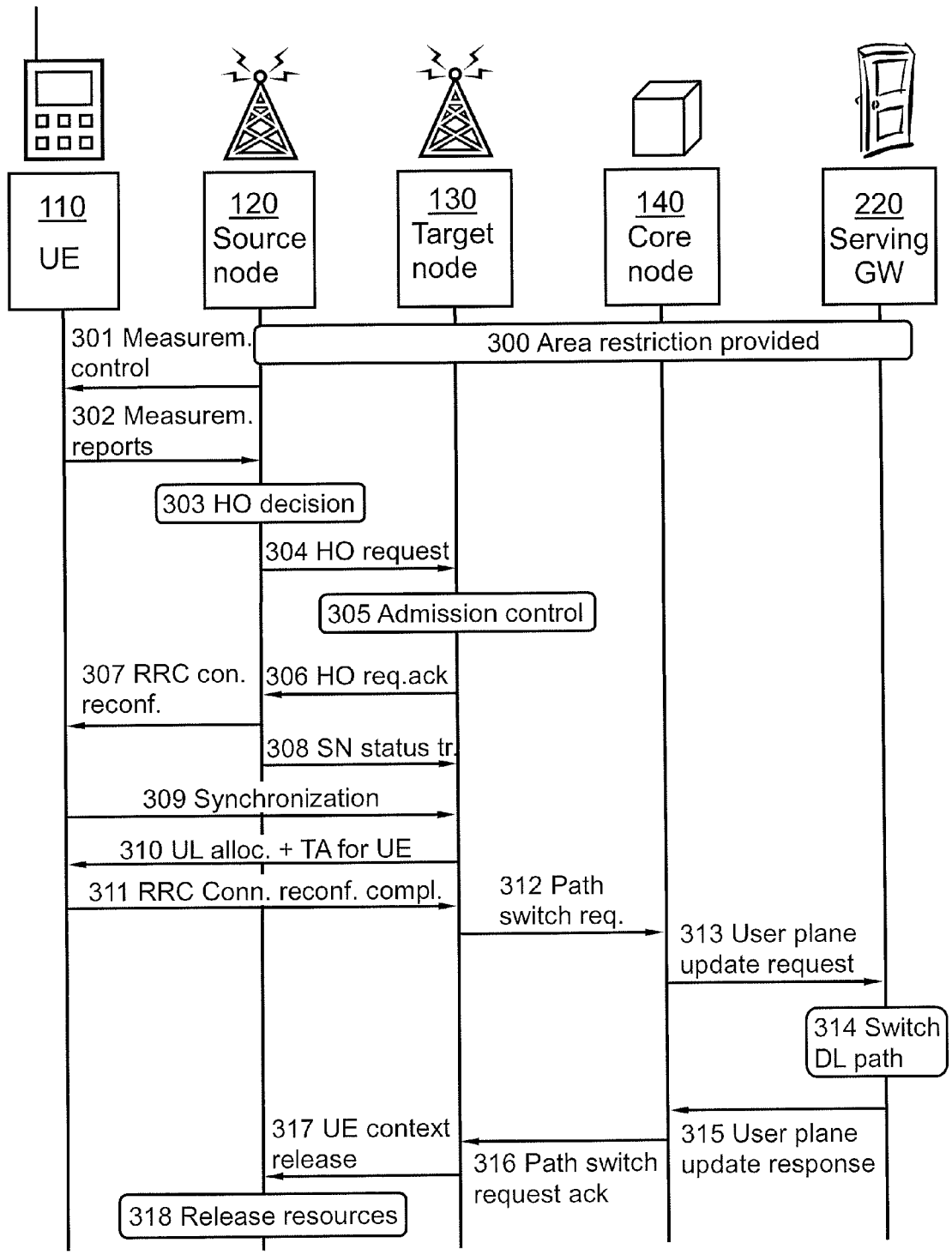
FIG. 3 is a combined signaling and flowchart illustrating an embodiment of the present method according to some embodiments.

FIG. 3 illustrates a combined signaling and flowchart depicting embodiments of the present method.

The X2 based handover for the user equipment 110 from the source node 120 to the target node 130 may be divided into a number of steps 300-318.

Step 300

Area restriction is provided concerning the source node 120, the target node 130, the core network node 140 and the serving gateway 220.

Step 301

A measurement control message is sent from the source node 120 to the user equipment 110.

Step 302

A measurement report is sent from the user equipment 110 to the source node 120 as a response to the previously sent measurement control message.

Step 303

A handover decision concerning the user equipment 110 is taken at the source node 120.

Step 304

A handover request is sent from the source node 120 to the target node 130. The handover request may comprise, or be sent together with time information and/or a priority level value associated with the user equipment 110.

The time information parameter may be either an absolute time on when the bearer was first requested at the source node 120 or a relative time on how long the bearer request has been queued in other nodes.

Step 305

An admission control is performed at the target node 130. Thus it is checked if the handover of the user equipment 110 to the target node 130 is possible, i.e. if resources are available. According to some embodiments, it may be checked if services with lower priority value be pre-empted.

Step 306

A handover request acknowledgement is sent from the target node 130 to the source node 120.

Step 307

RRC connection reconfiguration comprising mobility control information is sent to the user equipment 110. The user equipment 110 is detached from the source node 120 and synchronises with the target node 130.

Step 308

The source node 120 send a SN status transfer to the target node 130. The target node 130 buffer packets from the source node 120.

Step 309

Synchronisation between the user equipment 110 and the target node 130 is performed.

Step 310

Uplink allocation is performed and sent from the target node 130 to the user equipment 110.

Step 311

The user equipment 110 send RRC connection reconfiguration complete to the target node 130.

Step 312

The target node 130 send a path switch request to the core network node 140.

Step 313

A user plane update request is sent from the core network node 140 to the serving gateway 220.

Step 314

The downlink path is switched at the serving gateway 220.

Step 315

User plane update response is sent from the serving gateway 220 to the core network node 140.

Step 316

A path switch request acknowledgement is sent from the core network node 140 to the target node 130.

Step 317

Having received the acknowledgement, the target node 130 send a user equipment context release to the source node 120.

Step 318

The source node 120 releases resources and the handover is thereby completed.

Thus according to some embodiments, handover may be triggered for a user equipment 110 that have a queued bearer request. The present method is based on that the handover procedure is modified so that any pending bearer request in one source node 120 is transferred to the target node 130 after an inter-base station handover. Information about pending bearers/bearer requests can be transferred in the handover signaling e.g. in step 304.

FIG. 4 illustrates embodiments of the present method at a target node 130, adapted to provide service to a user equipment 110 when receiving a handover request concerning that user equipment 110.

A bearer request is received at the target node 130. The bearer request may comprise a priority value and/or time info parameter concerning the user equipment 110. Further, the bearer request may be sent from the core network node 140, such as an MME, according to some embodiments. Alternatively, the bearer request may be sent from the source node 120. However, it may according to some embodiments be that the bearer request is sent from one node, e.g. the core network node 140 and the priority value and/or time info parameter concerning the user equipment 110 may be sent in a separate message, e.g. from another node such as the source node 120.

The target node 130 may use this time information to determine which place the requested bearer should have in the priority queue of the target node 130 in case of congestion.

The time information parameter could be either an absolute time on when the bearer was first requested or a relative time on how long the bearer request has been queued in other nodes i.e. base stations such as the source node 120. In case of relative time the target node 130 may add the time queued in the own node to the time reported from the source node 120. In case the time information is absolute it does not need to be updated but instead the clocks in at least some of the different nodes 110, 120, 130, 140 involved in the handover with advantage may be reasonable synchronized.

It is then controlled at the target node 130 if resources available in the cell? If resources are available, resources are setup and a bearer accept is sent to the core network node 140. In such case, no further queuing is necessary.

However, if no resources are available, it may be checked if there are any queued bearer request with the same priority at the target node 130. If there are no queued bearer requests with the same priority, a new priority queue may be created for the new bearer request.

If there is at least one queued bearer request with the same priority at the target node 130, the new bearer request may be put in the existing priority queue. The position in the queue may be determined by the total queuing time, relative to the queuing time of other bearer requests.

The bearer request may then be put in the queue. Setup resources may be given to the queued bearer request which has the highest priority and/or longest waiting time according to a pre determined formula.

It may be mentioned as a non limiting illustrative example that any bearer request of a first priority value may be allocated setup resources in queuing time order as long as there are any bearer requests of the first priority value left. Then bearer requests of a second priority value may be allocated setup resources in queuing time order. Bearer requests of a third priority value may be allocated if they have a queuing time e.g. two times longer than the queuing time of the bearer requests of the second priority value with the longest queuing time, just to mention an arbitrary, non limiting example.

When resources are available, a bearer accept is sent to the core network node 140 and a bearer is set up for the user equipment 110 which has been selected by the queuing algorithm.

All of the herein described solutions make it possible to maintain a priority queue at handover. The present solutions may with certain advantage be used for all 3GPP specified handover scenarios, such as e.g. S1 based handover, Inter-RAT handover etc, including also inter-RNC/BSC handovers in UTRAN and GERAN as well as other systems like WiMAX, CDMA2000, UMB etc.

Figure 5:
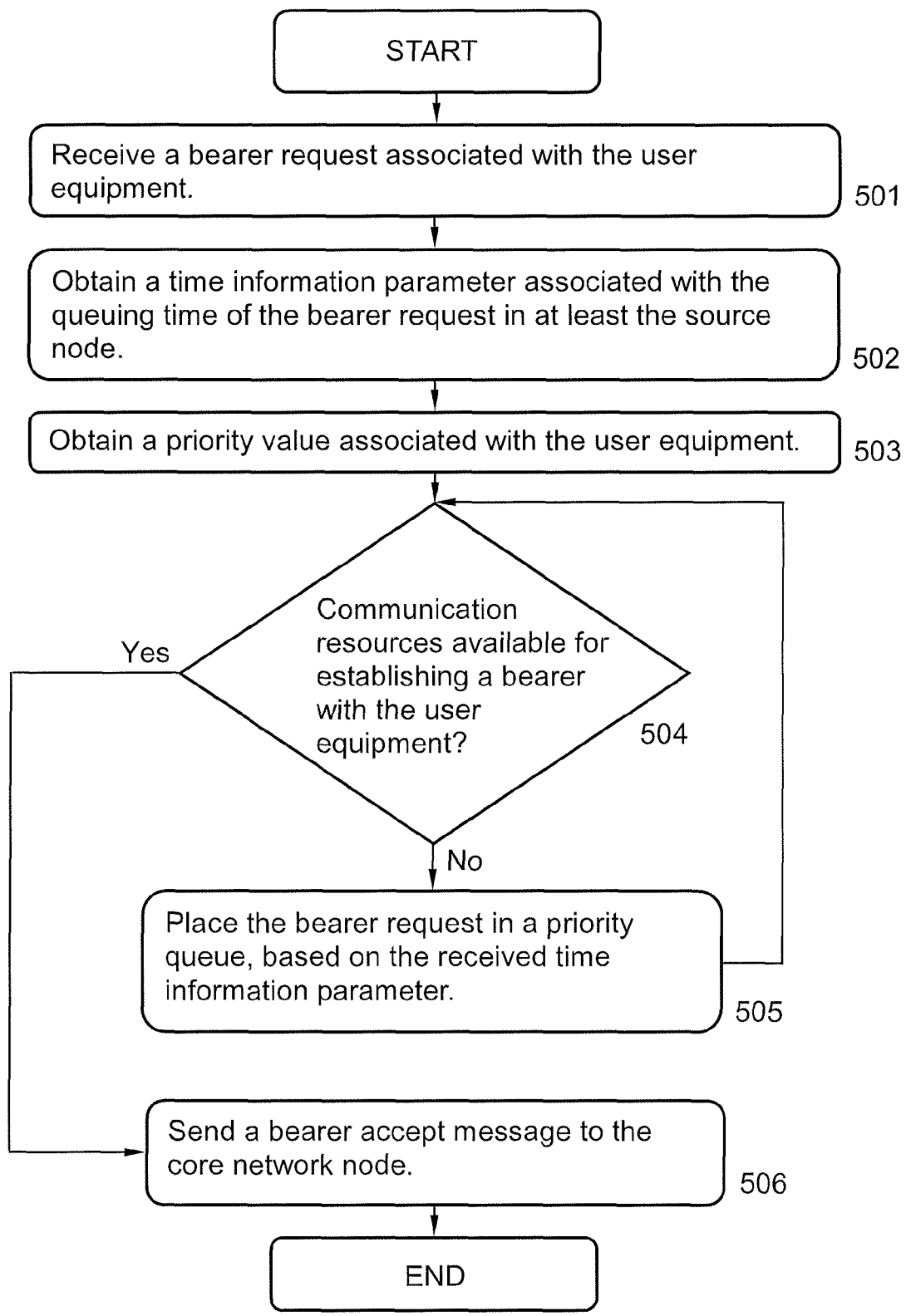
FIG. 5 is a flow chart depicting a method in a target node, according to some embodiments.

FIG. 5 is a flow chart illustrating a method in a target node 130 in a wireless communication system 100. The method aims at managing user equipment access to the target node 130. The wireless communication system 100 comprises the target node 130, a source node 120, a core network node 140 and a user equipment 110 being configured for wireless communication over a bearer with the source node 120 and for performing a handover from the source node 120 to the target node 130.

To appropriately manage user equipment access to the target node 130, the method may comprise a number of method steps 501-506. It is however to be noted that the method steps 501-506 may be performed in another chronological order than the enumeration indicates and that some of them, e.g. step 502 and step 503, or even all steps may be performed simultaneously or in an altered, arbitrarily rearranged, decomposed or even completely reversed chronological order. The method may comprise the following steps:

Step 501

A bearer request associated with the user equipment 110 is received.

The bearer request associated with the user equipment 110 may according to some embodiments be received from the source node 120. However, the bearer request may according to some embodiments be received from the core network node 140.

Step 502

A time information parameter associated with the queuing time of the bearer request in at least the source node 120 is obtained.

The obtained time information parameter may be an absolute time parameter, indicating the point in time when the bearer was first requested at the source node 120, according to some embodiments. However, according to some embodiments, the obtained time information parameter may instead be a relative time parameter, indicating how long time the bearer request has been queued in at least one node 120, different from the target node 130.

The obtained time information parameter may be received together with the bearer request associated with the user equipment 110, according to some embodiments.

Step 503

This step is optional and may only be performed within some embodiments.

A priority value associated with the user equipment 110 may according to some embodiments be obtained.

The obtained priority value may be received together with the bearer request associated with the user equipment 110, according to some embodiments.

Step 504

A check if communication resources are available for establishing a bearer with the user equipment 110 is performed.

The step of checking if communication resources are available may comprise releasing communication resources allocated to a bearer with lower priority and/or shorter queuing time than the bearer request associated with the user equipment 110, according to some embodiments.

Step 505

If communication resources are not available, the bearer request is placed in a priority queue, based on the received time information parameter.

The step of placing the bearer request in a priority queue may be based on the time information parameter and the priority value, according to some embodiments.

Step 506

If communication resources are available, a bearer accept message is sent to the core network node 140 and establishing wireless communication over a bearer with the user equipment 110.

Figure 6:
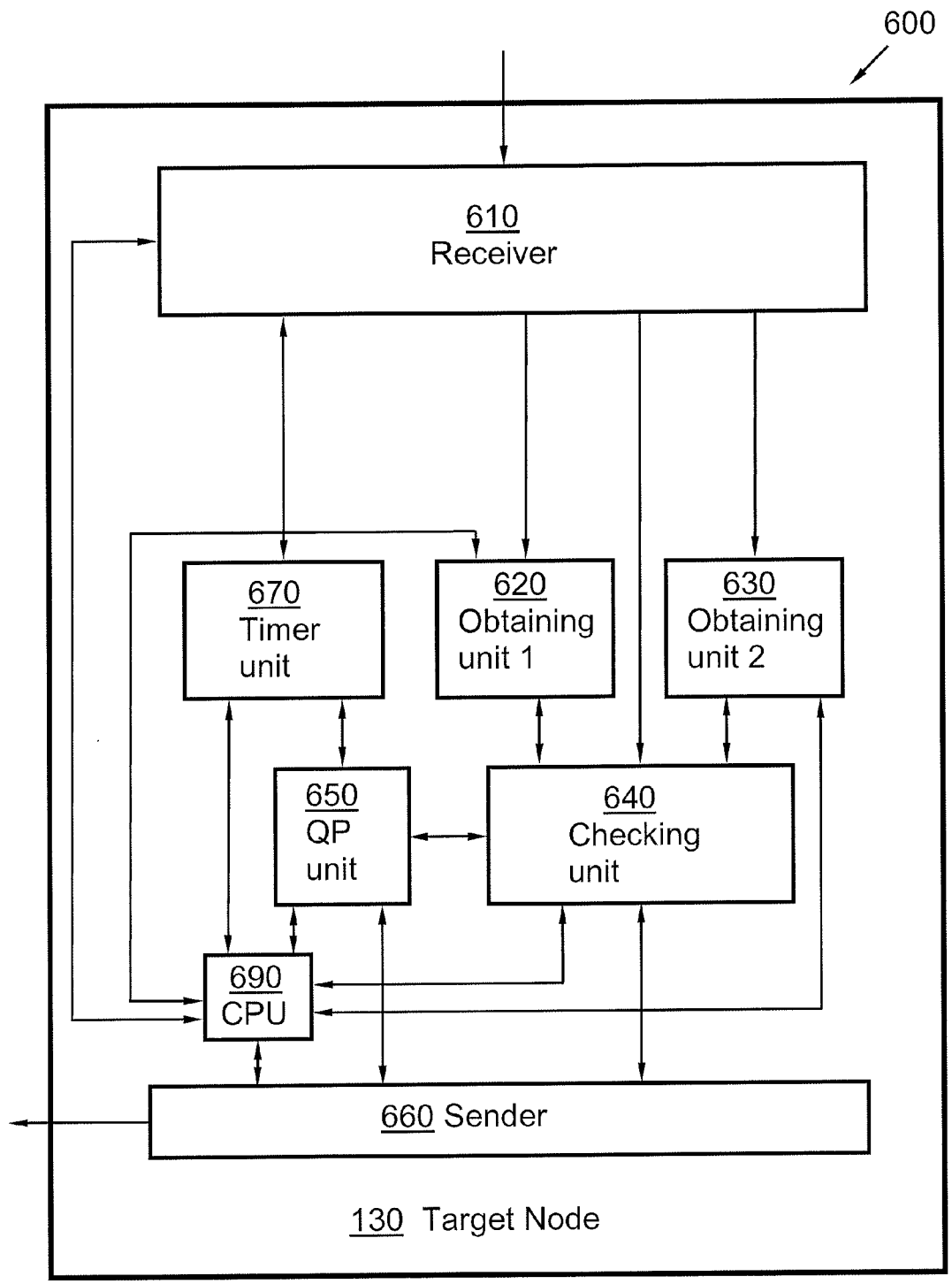
FIG. 6 is a block diagram depicting an arrangement in a target node, according to some embodiments.

FIG. 6 schematically depicts an embodiment of an arrangement 600 in a target node 130 in a wireless communication system 100. The arrangement 600 is adapted to perform the above described method steps 501-506. The arrangement 600 is thus adapted to manage user equipment access to the target node 130. The wireless communication system 100 comprises the target node 130, a source node 120, a core network node 140 and a user equipment 110. The user equipment 110 is configured for wireless communication over a bearer with the source node 120 and for performing a handover from the source node 120 to the target node 130.

Any internal electronics of the node 120, 130, 140, not completely necessary for the understanding of the present arrangement 600 in a target node 130, configured to perform a method according to steps 501-506 has been omitted from FIG. 6.

The arrangement 600 comprises a receiving unit 610. The receiving unit 610 is adapted to receive a bearer request associated with the user equipment 110. Also, the arrangement comprises an obtaining unit 620. The obtaining unit 620 is adapted to obtain a time information parameter associated with the queuing time of the bearer request in at least the source node 120. Further, the arrangement 600 comprises a checking unit 640. The checking unit 640 is adapted to check if communication resources are available for establishing a bearer with the user equipment 110. Further yet, the arrangement 600 comprises a queue placing unit 650. The queue placing unit 650 is adapted to place the bearer request in a priority queue, based on the received time information parameter.

Further, according to some embodiments, the arrangement 600 may comprise a second obtaining unit 630. The second obtaining unit 630 may be arranged to obtain a priority value, associated with the user equipment 110.

In addition, the arrangement 600 may further comprise a sending unit 660. The sending unit 660 may be adapted to send signals e.g. to the core network node 140, according to some embodiments.

The arrangement may further comprise a timer unit 670, according to some optional embodiments. The optional timer unit 670 may be adapted to generate a time parameter value associated with the moment of the bearer request for a user equipment 110. The timer 670 may according to some embodiments generate an absolute time value at the moment of the bearer request and set that absolute time value as the time parameter value associated with the moment of the bearer request for the user equipment 110. However, according to other embodiments, the generated time parameter value associated with the moment of the bearer request for the user equipment 110 may be subtracted from the present time value in order to achieve a relative time value, which in turn may be used as the time parameter value associated with the user equipment 110 when establishing the bearer request queue.

However, according to some embodiments, the arrangement 600 in the target node 130 may also comprise e.g. a control unit 690. According to some embodiments, the control unit 690 may be a Central Processing Unit (CPU), a microprocessor, a Peripheral Interface Controller (PIC) microcontroller or any other appropriate device which may be adapted to interpret computer program instructions and processes data.

It is to be noted that the described units 610-690 comprised within the arrangement 600 in the target node 130 are to be regarded as separate logical entities but not with necessity separate physical entities. Any, some or all of the units 610-690 may be comprised or co-arranged within the same physical unit. However, in order to facilitate the understanding of the functionality of the arrangement 600 in the target node 130, the comprised units 610-690 are illustrated as separate physical units in FIG. 6.

Some Particular Embodiments of the Present Target Node Method

The present method in the target node 130 in a wireless communication system 100 for managing user equipment access to the target node 130 may be implemented through one or more processors 690 in the target node 130, together with computer program code for performing the functions of the method. The computer program code may also be provided as a computer program product, for instance in the form of a data carrier carrying computer program code for performing the methods according to the present solution when being loaded into the processor unit 690. The data carrier may be a CD ROM disc, a memory stick, or any other appropriate medium such as a disk or tape that can hold machine readable data. The computer program code may furthermore be provided as program code on a server and downloaded to the target node 130 remotely.

Thus a computer readable medium is provided, encoded with a computer program for managing user equipment access to the target node 130. The wireless communication system 100 comprises the target node 130, a source node 120, a core network node 140 and a user equipment 110. The user equipment 110 is configured for wireless communication over a bearer with the source node 120 and for performing a handover from the source node 120 to the target node 130.

The computer program comprises computer program code configured to make the processor 690 comprised within the target node 130 perform the step of receiving a bearer request associated with the user equipment 110.

Also, the computer program code is configured to make the processor 690 perform the step of obtaining a time information parameter associated with the queuing time of the bearer request in at least the source node 120.

Further the computer program code is configured to make the processor 690 perform the step of checking if communication resources are available for establishing a bearer with the user equipment 110.

In addition, the computer program code is also configured to make the processor 690 perform the step of placing the bearer request in a priority queue, based on the received time information parameter, if communication resources are not available.

The program code may execute entirely in the target node 130, partly in the target node 130, as a stand-alone software package, partly in the target node 130 and partly on a remote computing device or entirely on the remote computing device. In the latter scenario, the remote computing device may be connected to the target node 130 through a network connection such as e.g. a local area network (LAN), a wide area network (WAN), or through the Internet using an Internet Service Provider.

Figure 7:
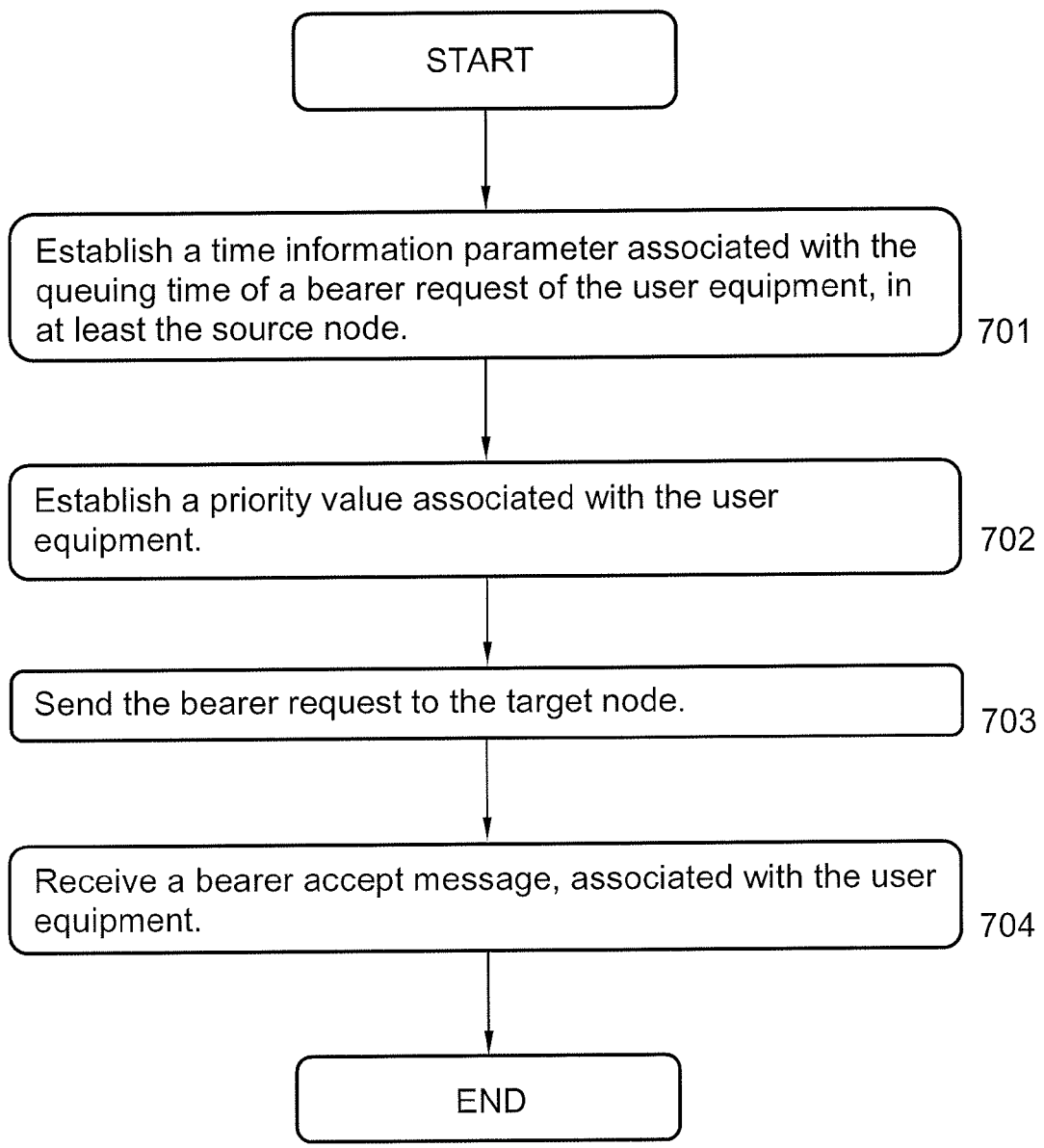
FIG. 7 is a flow chart depicting a method in a node, according to some embodiments.

FIG. 7 is a flow chart illustrating embodiments of the present method in a node 120, 140 in a wireless communication system 100. The present method aims at managing user equipment access to a target node 130. The wireless communication system 100 comprises a core network node 140, the target node 130, a source node 120, and a user equipment 110. The user equipment 110 is configured for wireless communication over a bearer with the source node 120 and for performing a handover from the source node 120 to the target node 130.

The node 120, 140 may be represented by a core network node 140 such as e.g. an MME, according to some embodiments. However, according to some embodiments the node 120, 140 may be the source node 120, e.g. a source base station, a source eNodeB etc according to some embodiments.

To appropriately manage user equipment access to the target node 130, the method may comprise a number of method steps 701-704. It is however to be noted that the method steps 701-704 may be performed in another chronological order than the enumeration indicates and that some of them, e.g. step 701 and step 702, or even all steps may be performed simultaneously or in an altered, arbitrarily rearranged, decomposed or even completely reversed chronological order. The method may comprise the following steps:

Step 701

A time information parameter associated with the queuing time of a bearer request of the user equipment 110 is established. It may be the queuing time of the user equipment 110 in the source node 120.

Step 702

This step is optional and may only be performed within some embodiments. A priority value associated with the user equipment 110 may be established, according to some embodiments.

Step 703

The bearer request is sent to the target node 130.

The bearer request may comprise the time information parameter associated with the queuing time of a bearer request of the user equipment 110 and/or the priority value associated with the user equipment 110, according to some embodiments.

Thus the bearer request to be sent to the target node 130 may comprise at least one parameter of the established time information parameter associated with the queuing time of the bearer request of the user equipment 110 or the priority value associated with the user equipment 110.

Step 704

This step is optional and may only be performed within some embodiments. A bearer accept message, associated with the user equipment 110 is received. The bearer accept message may be received from the target node 130.

Figure 8:
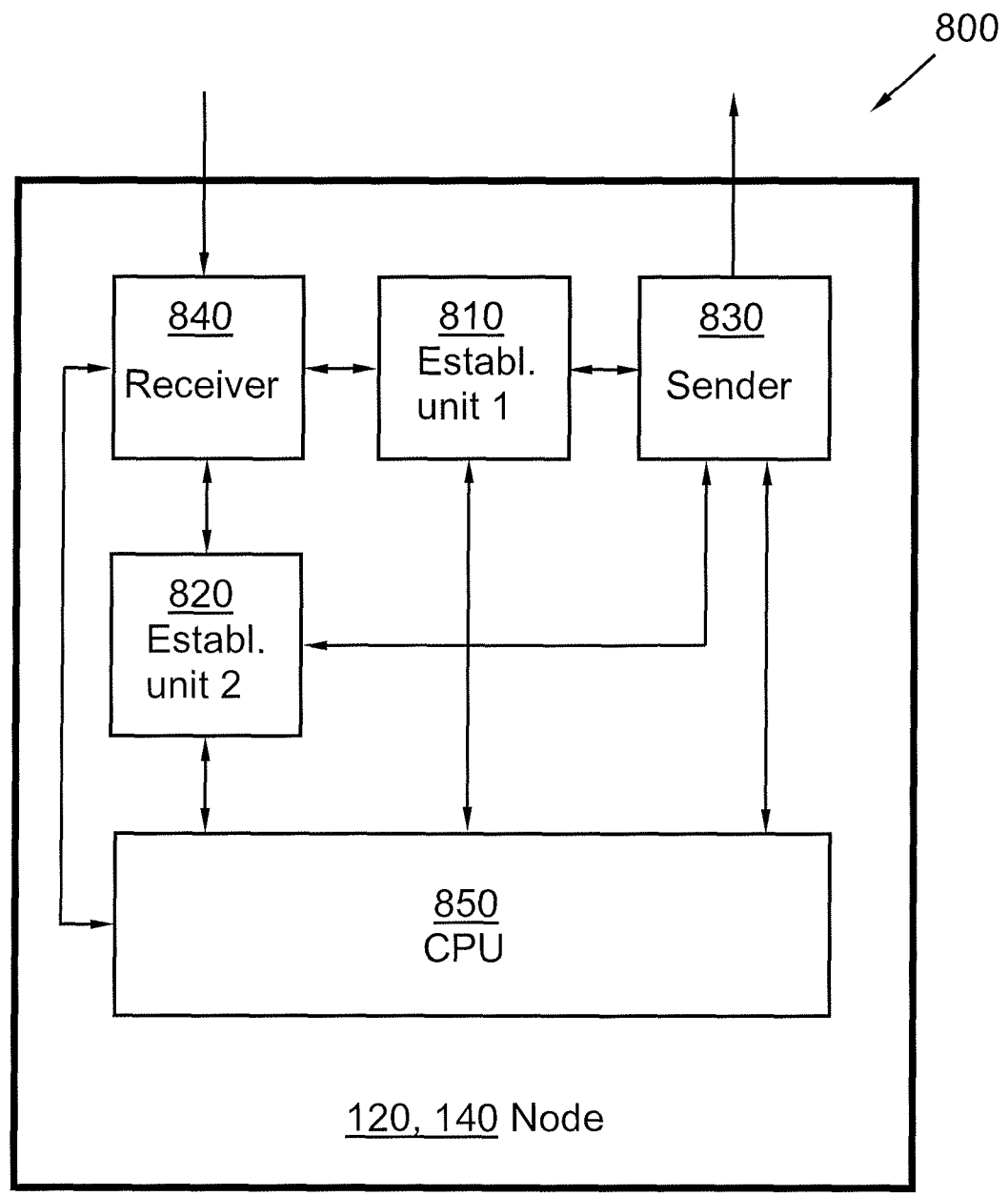
FIG. 8 is a block diagram depicting an arrangement in a node, according to some embodiments.

FIG. 8 schematically depicts an embodiment of an arrangement 800 in a node 120, 140 in a wireless communication system 100. The arrangement 800 is configured to manage user equipment access to a target node 130 by performing the method steps 701-706. The arrangement 800 is thus adapted to manage user equipment access to the target node 130. The wireless communication system 100 comprises the target node 130, a source node 120, a core network node 140 and a user equipment 110. The user equipment 110 is configured for wireless communication over a bearer with the source node 120 and for performing a handover from the source node 120 to the target node 130.

Any internal electronics of the node 120, 140, not completely necessary for the understanding of the present arrangement 800 in the node 120, 140 configured to perform a method according to steps 701-704 has been omitted from FIG. 8.

The arrangement 800 comprises an establishing unit 810. The establishing unit 810 is adapted to establish a time information parameter associated with the queuing time of a bearer request of the user equipment 110, in at least the source node 120. Also, the arrangement 800 comprises a sender 830. The sender 830 is adapted to send the bearer request to the target node 130.

The arrangement 800 may further comprise a second establishing unit 820, according to some embodiments. The second establishing unit 820 may be adapted to establish a priority value associated with the user equipment 110.

Further, the arrangement 800 may also comprise a receiver 840. The receiver 840 may be adapted to receive signals, according to some embodiments.

However, according to some embodiments, the arrangement 800 in the node 120, 140 may also comprise e.g. a control unit 850. According to some embodiments, the control unit 850 may be a Central Processing Unit (CPU), a microprocessor, a Peripheral Interface Controller (PIC) microcontroller or any other appropriate device which may be adapted to interpret computer program instructions and processes data.

It is to be noted that the described units 810-850 comprised within the arrangement 800 in the node 120, 140 are to be regarded as separate logical entities but not with necessity separate physical entities. Any, some or all of the units 810-850 may be comprised or co-arranged within the same physical unit. However, in order to facilitate the understanding of the functionality of the arrangement 800 in the node 120, 140, the comprised units 810-850 are illustrated as separate physical units in FIG. 8.

Some Particular Embodiments of the Present Node Method

The present method in the node 120, 140 in a wireless communication system 100 for managing user equipment access to the target node 130 may be implemented through one or more processors 850 in the node 120, 140, together with computer program code for performing the functions of the method. The computer program code may also be provided as a computer program product, for instance in the form of a data carrier carrying computer program code for performing the methods according to the present solution when being loaded into the processor unit 850. The data carrier may be a CD ROM disc, a memory stick, or any other appropriate medium such as a disk or tape that can hold machine readable data. The computer program code may furthermore be provided as program code on a server and downloaded to the node 120, 140 remotely.

Thus a computer readable medium is provided, encoded with a computer program for managing user equipment access to the target node 130. The wireless communication system 100 comprises the target node 130, a source node 120, a core network node 140 and a user equipment 110. The user equipment 110 is configured for wireless communication over a bearer with the source node 120 and for performing a handover from the source node 120 to the target node 130.

The computer program comprises computer program code configured to make the processor 850 comprised within the node 120, 140 perform the step of establishing a time information parameter associated with the queuing time of a bearer request of the user equipment 110, in at least the source node 120.

Also, the computer program code is configured to make the processor 850 perform the step of sending the bearer request to the target node 130.

The program code may execute entirely in the node 120, 140, partly in the node 120, 140, as a stand-alone software package, partly in the node 120, 140 and partly on a remote computing device or entirely on the remote computing device. In the latter scenario, the remote computing device may be connected to the node 120, 140 through a network connection such as e.g. a local area network (LAN), a wide area network (WAN), or through the Internet using an Internet Service Provider.

Some Clarification Concerning Interpretation of used Terminology and Expressions The terminology used in the detailed description of the particular exemplary embodiments illustrated in the accompanying drawings is not intended to be limiting of the invention. In the drawings, like numbers refer to like elements.

As used herein, the term "and/or" includes any and all combinations of one or more of the associated listed items.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. Method in a target node in a wireless communication system for managing user equipment access to the target node when a user equipment is performing a handover from a source node to the target node, the wireless communication system comprises the target node, the source node, a core network node and the user equipment being configured for wireless communication over a bearer with the source node and for performing the handover from the source node to the target node, the method comprises the steps of:
   receiving a bearer request associated with the user equipment,
   obtaining a time information parameter associated with a queuing time of the bearer request in at least the source node,
   checking if communication resources are available for establishing a bearer with the user equipment, and
   responsive to the communication resources not being available, placing the bearer request in a priority queue at the target node, responsive to the received time information parameter associated with the queuing time of the bearer request in at least the source node.

2. Method according to claim 1, wherein the method comprises the further step of:
   obtaining a priority value associated with the user equipment,
   and wherein the step of placing the bearer request in the priority queue is responsive to the time information parameter and the priority value.

3. Method according to claim 2, wherein the obtained priority value is received together with the bearer request associated with the user equipment.

4. Method according to claim 1, wherein the obtained time information parameter is an absolute time parameter, indicating the point in time when the bearer was first requested at the source node.

5. Method according to claim 1, wherein the obtained time information parameter is a relative time parameter, indicating how long a time the bearer request has been queued in at least one node, different than the target node, such that the bearer request is placed in the priority queue at the target node responsive to the obtained relative time parameter indicating how long a time the bearer request has been queued in the at least one node, different than the target node.

6. Method according to claim 5, wherein placing the bearer request in a priority queue responsive to the received time information parameter comprises placing the bearer request in a place in the priority queue ahead of another bearer request having a target node queuing time that is less than the relative time parameter and does not share a priority value of the bearer request.

7. Method according to claim 1, wherein the bearer request associated with the user equipment is received from the core network node.

8. Method according to claim 1, wherein the bearer request associated with the user equipment is received from the source node.

9. Method according to claim 1, wherein the obtained time information parameter is received together with the bearer request associated with the user equipment.

10. Method according to claim 1, wherein the step of checking if communication resources are available comprises causing a release of the communication resources allocated to a bearer with lower priority and/or shorter queuing time than the bearer request associated with the user equipment.

11. Method according to claim 1, comprising, responsive to the communication resources being available, the further step of:
   sending a bearer accept message to the core network node and establishing wireless communication over a bearer with the user equipment.

12. Method according to claim 1, wherein placing the bearer request in a priority queue responsive to the received time information parameter comprises placing the bearer request in a place in the priority queue where the bearer request would have been if the bearer request originated from the target node.

13. Method according to claim 1, further comprising adding the time information parameter to a time the bearer request is queued in the target node to form a relative time parameter, and wherein placing the bearer request in a priority queue responsive to the received time information parameter comprises placing the bearer request in a place in the priority queue responsive to the relative time parameter.

14. Method according to claim 1, wherein placing the bearer request in a priority queue responsive to the received time information parameter comprises placing the bearer request in a place in the priority queue at the target node responsive to the received time information parameter associated with the queuing time of the bearer request in at least the source node.

15. Method according to claim 1, wherein a priority queue from the source node is maintained at the target node at handover.

16. Arrangement in a target node in a wireless communication system for managing user equipment access to the target node when a user equipment is performing a handover from a source node to the target node, the wireless communication system comprises the target node, the source node, a core network node and the user equipment being configured for wireless communication over a bearer with the source node and for performing the handover from the source node to the target node, the arrangement comprises:

a receiving unit, adapted to receive a bearer request associated with the user equipment, an obtaining unit, adapted to obtain a time information parameter associated with a queuing time of the bearer request in at least the source node, a checking unit, adapted to check if communication resources are available for establishing a bearer with the user equipment, and a queue placing unit, adapted to place the bearer request in a priority queue at the target node, responsive to the communication resources not being available and responsive to the received time information parameter associated with the bearer request in at least the source node.

17. Arrangement in a target node according to claim 16, wherein the queue placing unit is further adapted to place the bearer request in a place in the priority queue at the target node responsive to the received time information parameter associated with the queuing time of the bearer request in at least the source node.

18. Method in a node in a wireless communication system for managing user equipment access to a target node when a user equipment is performing a handover from a source node to the target node, the wireless communication system comprises a core network node, the target node, the source node, and the user equipment being configured for wireless communication over a bearer with the source node and for performing the handover from the source node to the target node, the method comprises the steps of:

establishing a time information parameter associated with a queuing time of a bearer request of the user equipment, in at least the source node, and sending the bearer request and the time information parameter to the target node.

19. Method according to claim 18, wherein the method comprises the further step of:

establishing a priority value associated with the user equipment, and wherein the bearer request to be sent to the target node comprises at least one parameter of the established time information parameter associated with the queuing time of the bearer request of the user equipment and the priority value associated with the user equipment.

20. Method according to claim 18, wherein the node in the network is the core network node.

21. Method according to claim 18, wherein the node in the network is the source node.

22. Arrangement-in a node in a wireless communication system for managing user equipment access to a target node when a user equipment is performing a handover from a source node to the target node, the wireless communication system comprises a core network node, the target node, the source node, and the user equipment being configured for wireless communication over a bearer with the source node and for performing the handover from the source node to the target node, the arrangement comprises:

an establishing unit, adapted to establish a time information parameter associated with a queuing time of a bearer request of the user equipment, in at least the source node, and a sender, adapted to send the bearer request and the time information parameter to the target node.

* * * * *